Jan. 9, 1951 — R. S. WALTON — 2,537,321
FISH LINE RETARDING DEVICE AND RELEASE
Filed Feb. 9, 1946
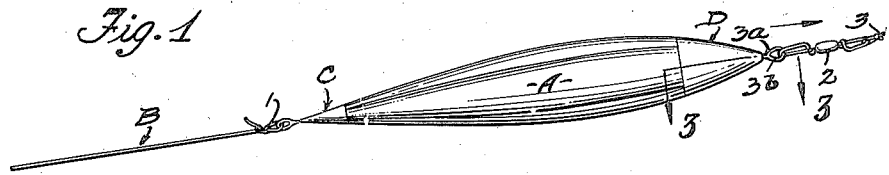
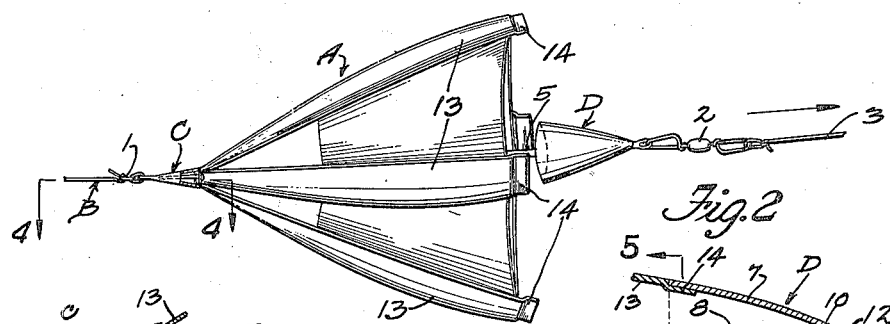
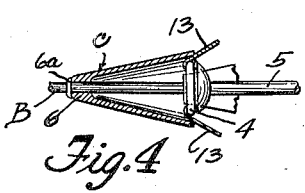
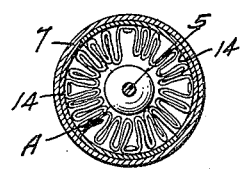
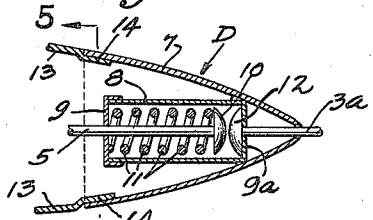
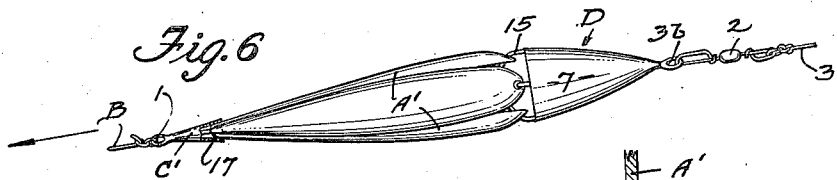
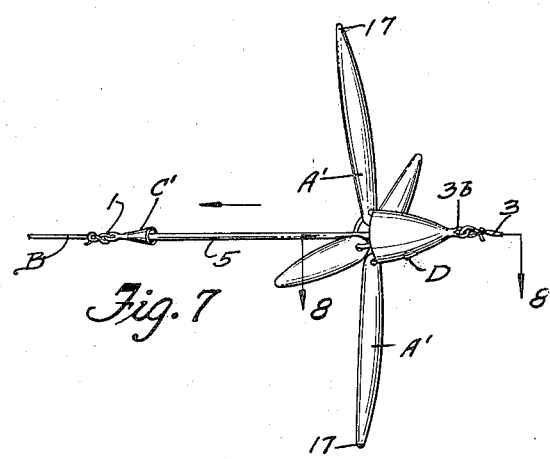
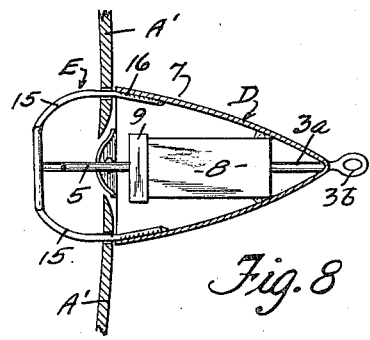
INVENTOR.
ROBERT S. WALTON
BY
ATTORNEY Patented Jan. 9, 1951

2,537,321

UNITED STATES PATENT OFFICE 2,537,321

FISH LINE RETARDING DEVICE AND RELEASE

Robert S. Walton, Los Angeles, Calif.

Application February 9, 1946, Serial No. 646,585

2 Claims. (Cl. 43—43.1)

This invention contemplates the provision of a retarding or drag means attachable to a fishing line, and means for releasing the same so as to become operative at the will of a fisherman, whereby when there is a "strike" at the bait or lure, a fisherman may play out the line to a desired extent under the pull of the fish on the line while the retarding or drag means is inoperative, and then at his will brake the reel so that the pull of the fish on the line will automatically release the retarding means so that it may then become operative for slowing down the progress of the fish in order that a sudden or too strong pull on the line may not break the line.

It is an object to provide a retarding means which is normally held inoperative, but which may at the will of the fisherman, or in some cases by tension of the line occasioned by a fish, be released and rendered operative.

Another object is to provide automatically operative means for releasing the retarding means.

Other objects will appear as the description of my improvements progresses.

I have shown in the accompanying drawings at least two forms of retarding means capable of being inoperatively held and of being released under certain conditions, but it will be understood that other forms of the device may occur to those skilled in the production and use of kindred devices, within the scope of the appended claims, without departing from the spirit of my invention.

In said drawings:

Fig. 1 is a view of a collapsed conical retarding means or drag attached to a fishing line, together with a suitable releasing device;

Fig. 2 is a view of the same as when released and expanded to operative position;

Fig. 3 is a fragmentary longitudinal section of the releasing mechanism on line 3—3 of Fig. 1;

Fig. 4 is a fragmentary longitudinal section of the retarding mechanism on line 4—4 of Fig. 2; and Fig. 5 is a transverse section on line 5—5 of Fig. 3;

Fig. 6 is a view of a modified form of retarding mechanism in collapsed and inoperative position;

Fig. 7 is a view of the same expanded to operative position; and

Fig. 8 is a longitudinal section of the releasing means applicable to the form of retarding means shown in Figs. 6 and 7.

Briefly described, my improvements include a drag A in the form of a conical drag, as shown in Figs. 1 to 5 inclusive, or A', as shown in Figs. 6, 7 and 8, adapted to be suitably connected at 1 to a line B through the instrumentality of a conical attaching member C, and a controlled releasing unit generally represented at D and adapted for connection, as at 2, to a snell 3. Member A may be made of fabric and is flexible and umbrella-like and its segments are attachable to a ring or other medium 4 at the open end of member C, as shown in Fig. 4. A rod or wire 5 is fixed to ring 4 and extends through member C and its end 6 externally of which the rod is anchored at 6a so that the drag A may not be detached from member C. A fishing line B is suitably attached to rod 5 which is in turn attached to a leader or snell 3.

Releasing unit D includes a substantially conical housing 7 within which is fixedly mounted a cylinder 8 having a closure 9 at its rear end. Rod 5 extends from member C through the center of the conical drag A and closure 9 into cylinder 8 and has a head 10 on its forward end between which and closure 9 a compression spring 11 is mounted. A snell 3 is suitably attached to unit D as by means of a button or head 12 inwardly of end 9a of the cylinder 8, as shown in Fig. 3, secured to a rod or wire 3a having an eye 3b. Drag A may have a plurality of metal ribs or vanes 13 with portions 14 at the ends thereof so formed, as shown in Figs. 2 and 3, that when the drag is collapsed the end portions 14 will fit under the edge of the conical member 7, and thereby serve to hold the drag collapsed until a pull on snell 3 against the tensioned line of sufficient power to compress spring 11 is given by a fish striking the hook on the snell which will disengage the portions 14 from member 7, whereupon a continued pull on the snell will open the conical element A, as shown in Fig. 2, and provide a drag on the line for retarding the progress of the fish. Ribs 13 are hinged on ring 4, as shown in Fig. 4.

In the form of device shown in Figs. 6, 7 and 8 the only major modification consists in the provision of a plurality of spoons A' which it is common knowledge are designed to rotate when moved through water, in lieu of the conical drag A. The spoons, instead of being hinged to member C are hinged to unit D, as by means of arcuate wires 15, which are commonly attached to the open end of member 7 (see Figs. 7 and 8). In this form of device the spoons A' are adapted to be collapsed, as in Fig. 6, with their outer ends 17 nested within the conical member C', which substantially corresponds to member C of the other form of device. Rod 5 is extended from cylinder 8 centrally between the spoons and suitably affixed to member C'.

Thus, a predetermined pull on the snell 3 will cause the detachment of the ends 17 from the member C' and the expansion of the spoons A' to the position shown in Fig. 7, due to their rapid rotation which is effective to throw the spoons out by centrifugal force thereby creating a drag on the leader and a retardation of the progress of the fish.

It is quite apparent that when a fish is snagged on the snell line the fisherman may play out his line to a desired extent as from a reel and at a desired time by braking the line the pull of the fish on the line will occasion the opening operation of the retarding unit by the compression of spring 11 in cylinder 8, thereby retarding the progress of the fish in its attempt to disengage itself from the hook and usually preventing breakage of the line.

Essentially, my invention includes a collapsible drag unit attached to a fishing line which is ineffective until released (by a tensioned element) either at the will of the fisherman or by a pull of predetermined extent by a fish caught on the line.

I claim:

1. In a fishing line, the combination with a leader and a line, of a collapsible and expansible drag element, and a control element interposed between and secured to the leader and the line, said drag element being held in collapsed position by the control element and released to assume operative position only upon the separation of the drag and control elements beyond a predetermined extent.

2. A fishing line drag including: an attaching member formed for attachment to a fishing line; a releasing member formed for attachment to a snell; a plurality of vanes pivoted on said attaching member for outward swinging movement and normally held in inward position with their free ends secured by said releasing member; a foldable drag element supported when extended by said vanes and folded within said vanes in collapsed position; and resilient means tending to draw the attaching and releasing members toward one another to hold the drag in collapsed position, the foldable element being released by tension imposed on the line at the will of the fisherman playing a caught fish and being distended by being dragged through the water by the fish.

ROBERT S. WALTON.

REFERENCES CITED

The following references are of record in the file of this patent:

UNITED STATES PATENTS

| Number | Name | Date |
| --- | --- | --- |
| 843,946 | Howald | Feb. 12, 1907 |
| 1,774,811 | Nelson | Sept. 2, 1930 |
| 1,793,870 | Rolker | Feb. 24, 1931 |